Figure 1:
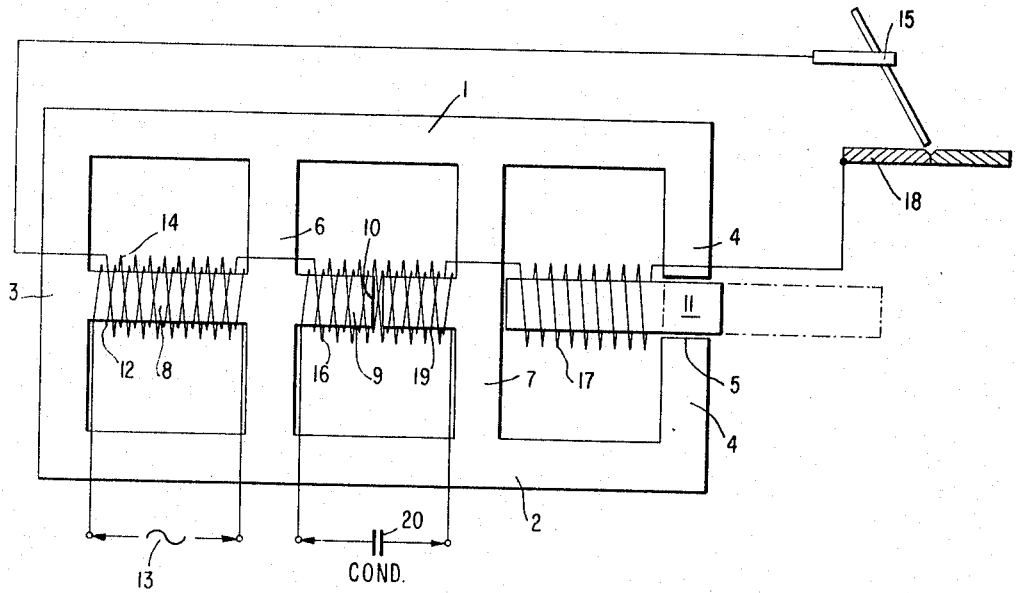

April 25, 1967  F. C. OWEN  3,316,481

SHELL TYPE WELDING TRANSFORMER

Filed Sept. 16, 1966

*INVENTOR.*
FREDERICK C. OWEN
BY

*Schlesinger, Arkwright & Garvey*
ATTORNEYS

United States Patent Office 3,316,481
Patented Apr. 25, 1967

3,316,481
SHELL TYPE WELDING TRANSFORMER
Frederick C. Owen, 206 Fenton Place,
Charlotte, N.C. 28207
Filed Sept. 16, 1966, Ser. No. 579,983
9 Claims. (Cl. 323—6)

This invention relates broadly to welding transformers and more particularly to an improved shell type A.C. welding transformer having a current regulating means in one end thereof.

One of the objects of the present invention is to provide a construction of transformer core for a shell-type welding transformer, which effectively utilizes the leakage flux path of the transformer to materially improve transformer characteristics, and the like.

Another object of the invention is to provide a construction of shell-type welding transformer core, having means in one intermediate core leg portion for effectively increasing the transformer leakage flux to provide welders with greater amperage output.

Another object of the invention is to provide a shell-type A.C. welding transformer which is simple in construction and unexcelled in the welding of all metals, and which is particularly outstanding in welding with inert gases. With the welder of the present invention no high frequency sparking equipment is required to start the welding arc, as is the case with most of available A.C. welders, and the arc is struck on the parent metal the same as on ordinary welding jobs. With the welding transformer of the present invention the parent metal is not contaminated when the welding electrode is in contact with the metal being welded, which is contrary to the characteristics of prior art welding machines.

A further object of the present invention is to provide a construction of shell-type welding transformer having capacitors inductively connected into the welding circuit to double or triple the frequency and add dozens of harmonics to the output current, to make the output welding current approach a continuous current (not D.C.) to give the output current the necessary characteristics for the very best in arc welding.

Still a further object of the invention is to provide a construction of shell-type welding machine having means at one end thereof for adjusting the output current from a predetermined minimum value to a predetermined maximum value.

Figure 2:
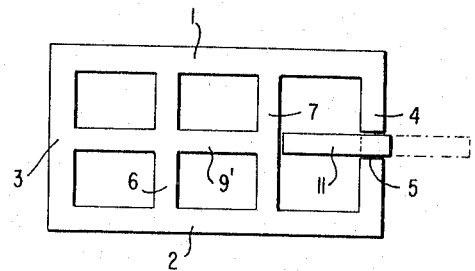

Other and further objects of the invention reside in the placement of the primary and main secondary windings at the opposite end of the central axis of the welding transformer from the current adjusting means to obtain maximum efficiencies from the magnetic circuit in the core and optimum arc characteristics, as well as the use of inductively coupled capacitors in the welding circuit to better the transformer power factor and provide lower open circuit voltages to lessen the danger to the welder operator when changing electrodes, and the like. This arrangement also requires less input current to the primary winding which reduces the kva. considerably. Additional objects of the invention will become apparent to one skilled in the art from the specification hereinafter following by reference to the accompanying drawing, in which:

FIG. 1 is an electrical schematic diagram of a shell-type welding transformer according to the invention; and FIG. 2 is a schematic diagram of a modified form of the core of the transformer according to FIG. 1 for use on smaller output welders.

Referring to the drawings in greater detail the magnetic core of the shell-type transformer of FIG. 1 comprises a top longitudinal leg portion 1 and a bottom longitudinal leg portion 2 joined at one end by side or end leg portion 3 and at the opposite ends by side or end leg portion 4 having an air gap indicated at 5 extending therethrough and dividing end leg portion 4 into two separate leg portions. Top and bottom longitudinal leg portions 1 and 2 in addition are connected intermediate the end leg portions 3 and 4 by a pair of transversely extending intermediate leg portions 6 and 7, which preferably extend generally parallel with side or end leg portions 3 and 4, but in spaced relation thereto. End leg portion 3 and intermediate leg portion 6 are connected intermediate their ends by intermediate longitudinal core leg section 8, and in like manner transversely extending intermediate leg portions 6 and 7 are connected intermediate the ends thereof by means of intermediate longitudinal core leg section 9 containing air gap 10. Air gap 10 may be positioned at any desirable point along leg section 9.

A longitudinally movable shunt core section 11 is positioned in air gap 5 at substantially right angles to end leg portion 4 and is connected for longitudinal movement toward and away from intermediate leg portion 7. The movable shunt member 11 may be set even with the iron of the air gap 5 or a small air gap may be provided between the shunt and the termianl ends of end leg portion 4 which form the air gap 5, depending upon the particular requirements of the welding machine. Core leg sections 8 and 9 and movable shunt core section 11 are preferably disposed in axial alignment, as shown in the drawings, and are disposed substantially parallel with top and bottom longitudinal leg portions 1 and 2, and are preferably positioned generally midway between top and bottom longitudinal leg portions 1 and 2 such that the core is symmetrically constructed so that the flux paths produced therein, an explained further in this specification, are symmetrical.

Transformer primary winding 12 is wound on core leg section 8, between end leg portion 3 and intermediate leg portion 6. The primary winding is connected across a suitable source of A.C. power, in the usual manner, as indicated at 13. Main secondary winding 14 is wound concentrically with primary winding 12 on leg section 8 either above or below the primary winding. One end of main secondary winding 14 is connected to the welding electrode, indicated generally at 15, and the opposite end of the winding is connected to one end of auxiliary secondary winding 16 wound on core leg section 9 between intermediate leg portions 6 and 7. The opposite end of auxiliary secondary winding 16 is connected to one end of reactance winding 17 connected in stationary relation with the transformer core between end leg portion 4 and intermediate leg portion 7. The axis of reactance winding 17 is disposed in alignment with air gap 5, and the diameter of the reactance winding is of a dimension such that movable shunt core section 11 is adjustable to move longitudinally in and out of the center of winding 17. Reactance winding 17 is thus disposed in surrounding relation to shunt core section 11 when this member is adjusted to its fully inserted position as shown in full lines in FIG. 1. The opposite end of reactance winding 17 is connected to the work 18.

The welding circuit is thus comprised of main secondary winding 14, auxiliary secondary winding 16, and reactance winding 17 connected in series aiding with the welding electrode 15 and the work 18. The windings 14, 16 and 17 are disposed in axial alignment and by placing the primary winding 12 and the main secondary winding 14 on leg section 8, the flux created by these windings has a straight path through the central portion of the transformer, that is, through leg sections 8, 9, and shunt core section 11, when it is inserted, such that this main flux path is not interrupted on its way to the reactance winding 17. Reactance winding 17, used in conjunction with its associated movable shunt core section 11, in effect is a tuned circuit connected in series with the secondary output circuit and enables even more current to be generated in the secondary circuit when the welding arc is struck and provides selective regulation of the secondary welding current. When the welding transformer is in operation, the welding current is a maximum when shunt member 11 is in its fully withdrawn position as indicated in dotted lines in FIG. 1, and the secondary welding current is a minimum when shunt member 11 is in its fully inserted position as shown in full lines in FIG. 1. By placing the tuned circuits 17, 11, in axial alignment with leg sections 8 and 9 and primary and secondary windings 12, 14, and 16, as well as capacitor charging winding 19, to be explained, no interference is encountered by the magnetic circuit on its way to the reactance winding, and this arrangement is apparently responsible for the disturbance-free welding arc produced by this transformer.

A capacitor charging winding 19 is wound concentrically on leg section 9 with auxiliary secondary winding 16, in inductive relation therewith, and is provided with a bank of capacitors 20 connected between opposite ends of the winding. Immediately upon striking of the welding arc, auxiliary secondary winding 16 is energized, and since capacitor charging winding 19 is inductively coupled therewith, the capacitors 20 immediately charge to their maximum value, thus enabling the welding transformer to operate as efficiently as a welding transformer having much greater open circuit voltages and yet, at the same time, giving the advantage of a welding transformer having much lower open circuit voltage, since the capacitors 20 do not increase the open circuit voltage of the welder. The capacitors 20 act to increase or decrease the frequency of the welding current, depending upon the size and number of capacitors employed since they are part of an independent oscillating or tuned circuit consisting of the capacitors 20 and the capacitor charging winding 19, and enable the operator to maintain the welding arc as constant as possible as set forth in greater detail in Patent No. 2,365,722, issued to me on Dec. 26, 1944, for Transformer. The operation of the capacitors 20 in the present circuit is generally similar to the capacitance in the mentioned patent, although their placement in the circuit is somewhat different.

Air gap 10 on leg section 9 is provided to create additional leakage flux in the transformer which is necessary to provide welding machines in the range of 500 amperes and up. This leakage flux creates additional flux paths within the core member and this flux in addition to flux paths created by capacitor charging winding after the arc is struck and the capacitors are charged, coacts with the magnetic flux paths established by the primary winding and the magnetic flux paths set up in the core by reactance winding 17 itself, in a manner not completely understood, to provide the favorable and relatively large output welding current. When the arc is struck many different flux paths are set up within the transformer core, traveling through the various legs of the core and the adjustment of movable shunt member 11 from its fully inserted position to its fully withdrawn position affects the main magnetic circuit through the central portion of the shell-type transformer such as to vary the number of flux paths cut by reactance winding 17.

In larger welding transformers, such as those capable of producing 500 amperes and greater, if an air gap 10 is not provided in leg section 9 of the core, a substantially greater number of turns would be required in reactance winding 17 to compensate for the low amperages, as the large number of turns would be required to also enable the output welding current to be reduced to a minimum. Thus by providing the air gap to create additional leakage flux a fewer number of turns is required in the secondary welding circuit.

For smaller type welding transformers, namely those capable of producing less than 500 amperes maximum output welding current, the additional leakage flux created by the air gap 10 is not required, and the air gap can be eliminated so that an uninterrupted leg section 9', as shown in FIG. 2, is connected to bridge the mid-sections of intermediate leg portions 6 and 7 of the transformer core. In the lower current output welding transformers according to the invention, sufficient leakage flux is produced by the reactance winding 17, after the arc is struck, so that the additional air gap created leakage flux is not required. The welding circuit for the transformer of FIG. 2 is the same as that shown in FIG. 1 and has therefore been eliminated from FIG. 2. The shell-type A.C. welding transformer of the invention has been constructed and operated and has been found to be unexcelled in the welding of all metals. No heating problems have been encountered with the transformer but where relatively small copper area is employed forced ventilation may be required to eliminate heating problems. However, with the use of proper copper area in the welder no heating problems have been encountered. The welding arc is very easy to strike and maintain while welding and the parent metal is not contaminated when the electrode is in contact with the metal being welded.

While the invention has been shown and described in certain preferred embodiments, it is realized that modifications can be made without departing from the spirit of the invention and it is to be understood that no limitations upon the invention are intended other than those imposed by the scope of the appended claims.

What I claim as new and desire to secure by Letters Patent of the United States, is as follows:

1. A shell type welding transformer comprising a generally rectangular core including longitudinal leg portions and end leg portions, a pair of intermediate leg portions connecting opposite longitudinal leg portions of said core intermediate said end leg portions, a first longitudinal leg section extending between one of said end leg portions and the adjacent intermediate leg portion, a second longitudinal leg section extending between said pair of intermediate leg portions, an air gap in the other of said end leg portions at one end of the core, a shunt core section longitudinally movable in said air gap, said first and second longitudinal leg sections and said shunt core section disposed substantially normal to said pair of intermediate leg portions, inductively coupled primary and secondary windings for producing a secondary output current positioned about said first and second longitudinal leg sections and said shunt core section, and said shunt core section movable toward and away from the other intermediate leg portion to adjust the secondary output current from a predetermined minimum to a predetermined maximum.

2. A shell type welding transformer as set forth in claim 1 in which an inductively coupled primary and main secondary winding are disposed on said first longitudinal leg section, an auxiliary secondary winding disposed on said second longitudinal leg section, another secondary winding disposed about said shunt core section, whereby said shunt core section is movable through the longitudinal center of said air gap, and all of said secondary windings connected in series circuit.

3. A shell type welding transformer as set forth in claim 2, including charge storage means, a charging winding disposed on said second longitudinal leg section in inductive relation with said auxiliary secondary winding and connected to charge said charge storage means when the circuit of the secondary windings is completed.

4. A shell type welding transformer as set forth in claim 2 in which all of said windings are disposed in substantially axial alignment.

5. A shell type welding transformer as set forth in claim 1 in which said first and second longitudinal leg sections and said shunt core section are substantially axially aligned with each other.

6. A shell type welding transformer as set forth in claim 1 in which said first and second longitudinal leg sections and said shunt core section are disposed substantially midway between and substantially parallel with said longitudinal leg portions.

7. A shell type welding transformer as set forth in claim 1, including another air gap in said second longitudinal leg section.

8. A shell type welding transformer as set forth in claim 3 including another air gap in said second longitudinal leg section, whereby additional leakage flux is developed in said rectangular core to increase the secondary current.

9. A shell type welding transformer as set forth in claim 1 in which said pair of intermediate leg portions are substantially parallel with said end leg portions, and substantially symmetrically spaced with each other and said end leg portions.

References Cited by the Examiner

UNITED STATES PATENTS

| | | | |
|---|---|---|---|
| 2,248,070 | 7/1941 | Fanger | 336—133 |
| 2,668,250 | 2/1954 | Henderson | 336—165 X |
| 2,790,960 | 4/1957 | Wyman | 336—133 X |
| 3,127,580 | 3/1964 | Owen | 336—133 |
| 3,147,455 | 9/1964 | Owen | 336—180 X |

JOHN F. COUCH, *Primary Examiner.*

A. D. PELLINEN, *Assistant Examiner.*